Feb. 17, 1959  D. W. BARTLETT  2,873,549
ADJUSTABLE ARTIFICIAL LURES
Filed June 22, 1956
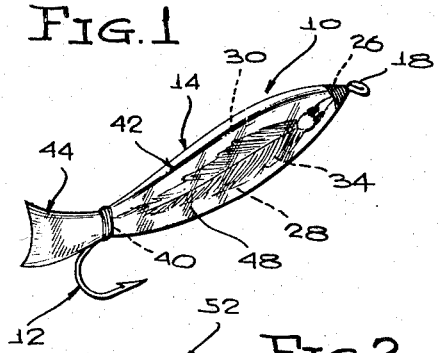
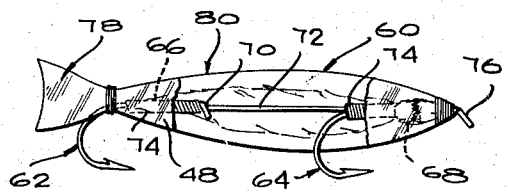
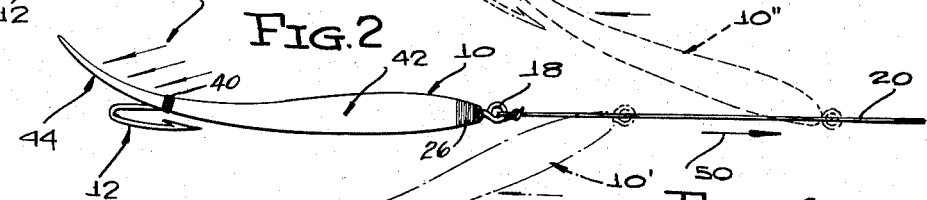
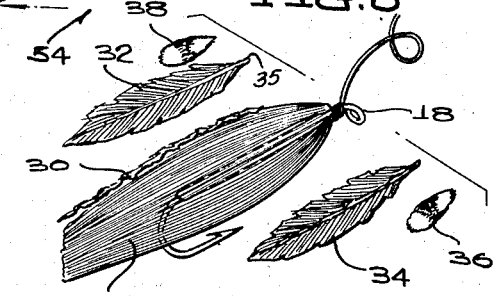
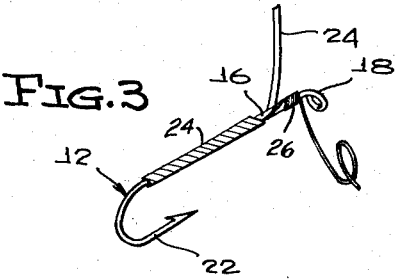
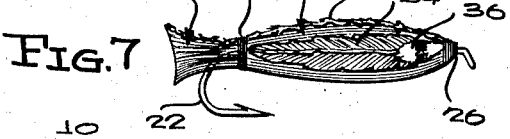
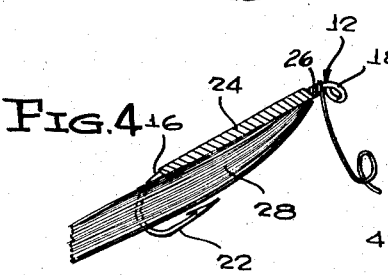
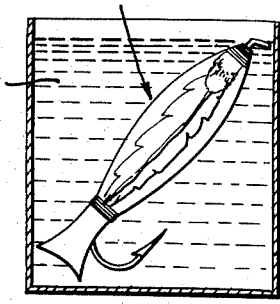
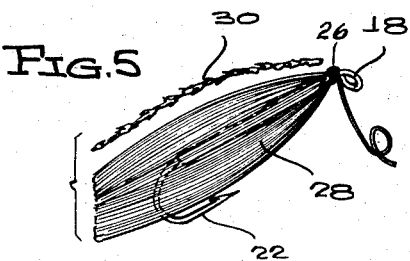
INVENTOR.
DANA W. BARTLETT
BY
McMorrow, Berman + Davidson
ATTORNEYS

United States Patent Office 2,873,549
Patented Feb. 17, 1959

2,873,549

ADJUSTABLE ARTIFICIAL LURES

Dana W. Bartlett, Bar Harbor, Maine

Application June 22, 1956, Serial No. 593,291

1 Claim. (Cl. 43—42.22)

This invention relates to improved adjustable artificial fish lures, and to a method of making the lures.

The primary object of the invention is to provide more practical and more efficient lures which more closely simulate the appearance and movements of live bait fish, and which are adjustable as to shape, contour, and relative angulation of their components for obtaining desired actions in the water, the lures having body forming coatings of material which is capable of being softened in hot liquid sufficiently to enable reshaping of the lures for the purposes indicated, and which, upon cooling and drying become hard and rigid, the lures being composed of a small number of simple and easily assembled parts.

Another object of the invention resides in a simple and efficient method for constructing the lures.

A further object of the invention is to provide adjustable artificial lures of the character indicated, which can be made in attractive, rugged, and serviceable forms at relatively low cost, are easily used, and are highly satisfactory for the purposes intended.

These together with other objects and advantages which will become apparent reside in the details of construction and operation as more fully hereinafter described and claimed, reference being had to the accompanying drawings forming a part hereof, wherein like numerals refer to like parts throughout the several views and in which:

Figure 1 is a perspective view of a lure of the invention;

Figure 2 is a schematic top plan view of the lure, showing the same secured to a fishing line, the lure being shown in different positions in phantom lines resulting from forward movement of the lure in water;

Figure 3 is a perspective view showing one step of the method of constructing the lure;

Figure 4 is a perspective view showing a further step in the method;

Figure 5 is an exploded perspective view showing a still further step in the method;

Figure 6 is an exploded perspective view showing a yet further step in the method;

Figure 7 is a side elevational view of the assembled lure trimming thereof and prior to being coated;

Figure 8 is a side elevational view showing the assembled and trimmed lure being dipped for coating the same with a semi-flexible coating material, the container for the material being shown in section; and Figure 9 is a side elevational view of another form of the lure of the invention broken away to show interior structure.

Referring to the drawings in detail, the lure illustrated in Figures 1 to 8, indicated generally at 10, includes a conventional fish hook 12 having secured on its shank 16 a fish body, indicated generally at 14, simulating and conforming substantially to the shape of a selected live bate fish.

As seen in Figure 3, the fish hook includes a shank 16 having on its forward end an eye 18 to which a fishing line leader 20 is to be secured, as seen in Figure 3, and a barbed snell 22 on its rear end. Circumposed on the shank 16 is a coil 24 of a suitable tinsel material which is partially visible through the tying material subsequently applied on the shank 16, the coil of tinsel material also serving as means for increasing the weight of the lure for the purpose of obtaining a particular action of the lure in the water. The coil 24 of tinsel can be eliminated if desired.

A length 26 of suitable material, such as nylon or silk thread, is wound on the shank 16 adjacent the eye 18 for securing thereon end portions of buck hairs 28 of suitable color, in longitudinally extending relationship along the shank 16, so as to simulate the under belly of a live bait fish, for example. Secured in overlying longitudinally extending relationship on the hairs 28, see Figure 5, is a strip 30 of fly-tying material, such as the tendrils of the tail feathers of a peacock, which may be of a substantially dark color so as to simulate the back of a live bait fish. Secured on opposite sides of the buck hairs 28 are elongated common game cock saddle feathers 32 and 34, the ends of whose stems 35 are secured on the shank 16 of the fish hook 12 by means of the tying thread 26. Applied to opposite sides of the lure in overlying relationship to the stem ends 35 of the game cock saddle feathers 32 and 34, are jungle cock eyes 36 and 38, however, any suitable artificial eyes may be used instead. The forward ends of the eyes 36 and 38 are secured in place by means of the band of tying thread 26. Circumposed about the rear end portion of the fish hook shank 16 is a second band 40 of tying material which separates the body portion, indicated generally at 42, from the tail portion, indicated generally at 44.

It will be noted that the tail portion 44 is composed of rearwardly extending end portions of the buck hairs and are disposed in mutually divergent relationship from the tying strand 40, and the tail portion is trimmed to simulate the tail portion of a live bate fish.

Indicated generally at 46 is a container of a liquid coating material 48 such as varnish, lacquer, or plastic which is semi-flexible when dry, "Duco" manufactured by the Dupont Corporation is satisfactory for this purpose. The lure is immersed in the coating material 48, and is then removed from the coating material and permitted to partially dry. Before the coating is dry the tail portion 44 is adjusted laterally out of alignment with the body portion 42 of the lure for the purpose of obtaining hydrodynamic characteristics when the lure is drawn through the water, simulating those of the darting or swimming actions of a live bait. After the tail portion 44 has been thus adjusted, the lure can then be re-immersed in the coating material 48 for applying succeeding coats of this material on the lure. The coating material water-proofs the fly-tying materials and prevents deterioration of the same in use. When "Duco" cement is used for the coating of the lure, the resultant coating can be softened by immersing the lure in a relatively hot liquid, such as water. Because of this, the shape, contour, and relative angles of any portions of the lure can be changed as desired by manually or otherwise shaping and bending portions of the lure which have been immersed in hot water for a sufficient time to substantially soften the coating material, and then permitting the coating material, such as "Duco" cement, to dry and set or harden.

When, as seen in Figure 2, the lure 10 is drawn forwardly in the water in the direction indicated by the arrow 50, water flows, as indicated by the arrows 52, against the laterally curved tail portion 44 of the lure and swing the lure to the position indicated at 10' in angular relation to the line of forward movement. As the lure reaches the position indicated at 10', the water, as indicated by the arrows 54, strikes the opposite side of the lure and swings the lure to the oppositely angled position indicated at 10″, whereat the tail portion 44 of the lure is struck by the water, as indicated by the arrows 56, so that the lure is restored substantially to the oppositely angled position shown at 10′. Thus, during forward movement of the lure, the lure makes darting sidewise movements.

Another form of the invention, shown in Figure 9, and indicated generally at 60, incorporates rear and forward fish hooks 62 and 64, having shanks 66 and 68, respectively. The shank 66 or the rear hook 62 has an eye 70 through which extends the rear end of a longitudinally disposed nylon or wire cord 72 which lies along the shank 66. The forward end of the cord 72 extends longitudinally along the rear or trailing end of the shank 68 of the forward hook 64. The ends of the cord 72 are secured on the respective shanks 66 and 68 by windings 74 of nylon or silk threads. The forward hook 64 has on its end an eye 76 to which a conventional leader 20 is to be secured. In all other respects the lure 60 of Figure 9 is the same in construction as the lure 10 of Figures 1 to 8. The tail portion 78 of the lure 60 is laterally adjustable relative to the body portion 80 in the same way, so as to obtain action characteristics similar to those of the lure 10 of Figures 1 to 8.

The foregoing is considered to be illustrative only of the principles of the invention. Since numerous modifications and changes will readily occur to those skilled in the art, it is not desired to limit the invention to the exact construction and operation shown and described, and accordingly all suitable modifications and equivalents may be resorted to, as fall within the scope of the appended claim.

What is claimed is:

An adjustable artificial fish lure comprising a first and a second fishhook, each of said fishhooks having a shank having forward and rear ends, a leader attaching eye on said forward end of each fishhook, a barbed portion on the rear end of each of said fishhooks, a longitudinal cord having one end secured to the forward end of the shank of said first fishhook and having the other end secured to the rear end of the shank of said second fishhook, a single feather having a spine having a forward end, said feather extending along the shanks and trailing behind the shank of said second fishhook, a first winding securing the forward end of the spine on the shank near the eye of said first fishhook, a second winding circumposed on said feather and the shank of said second fishhook at the rear end of the shank and securing the feather to said second shank, said second winding embracing said feather so as to define a body portion forwardly of the second winding and a tail portion behind the second winding, a coating enclosing the tail portion and the body portion, said coating being normally hard and relatively rigid but capable of being temporarily softened by immersing in hot liquid to enable reforming the body and/or tail portions and angulating the tail portion relative to the body portion and capable of resuming its hard and relatively rigid form upon cooling and drying, and a barb on the rear end of the shank of said second fishhook, said first winding being on the forward end of the shank of said first hook, and said second winding being on the rear end of the shank of said second hook.

References Cited in the file of this patent
UNITED STATES PATENTS

| | | |
|---|---|---|
| 1,395,533 | Tuttle | Nov. 1, 1921 |
| 2,018,622 | Davenport | Oct. 22, 1935 |
| 2,134,401 | Harvey | Oct. 25, 1938 |
| 2,148,799 | Bilinski | Feb. 28, 1939 |
| 2,531,738 | Marsico | Nov. 28, 1950 |
| 2,605,578 | Waterton | Aug. 5, 1952 |
| 2,643,418 | Auldridge | June 30, 1953 |
| 2,740,226 | Arff | Apr. 3, 1956 |
| 2,776,518 | Felmlee | Jan. 8, 1957 |